US006892235B1

(12) United States Patent
Daude et al.

(10) Patent No.: US 6,892,235 B1
(45) Date of Patent: May 10, 2005

(54) METHOD AND SYSTEM FOR OPTIMALLY SELECTING A WEB FIREWALL IN A TCB/IP NETWORK

(75) Inventors: Olivier Daude, Nice (FR); Andrew Forth, Richmond (GB); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/515,780

(22) Filed: Feb. 29, 2000

(30) Foreign Application Priority Data

Mar. 5, 1999 (EP) .............................. 99480011

(51) Int. Cl.[7] .............................................. G06F 15/173
(52) U.S. Cl. ...................... 709/224; 709/225; 709/226; 709/227; 714/718; 714/815
(58) Field of Search ................ 709/224, 225, 709/226, 227, 105, 104, 204; 714/718, 815

(56) References Cited

U.S. PATENT DOCUMENTS

| | | | | |
|---|---|---|---|---|
| 5,459,837 | A | * 10/1995 | Caccavale | 709/226 |
| 6,138,157 | A | * 10/2000 | Welter et al. | 709/224 |
| 6,175,869 | B1 | * 1/2001 | Ahuja et al. | 709/226 |
| 6,304,904 | B1 | * 10/2001 | Sathyanarayan et al. | 709/224 |
| 6,317,786 | B1 | * 11/2001 | Yamane et al. | 709/224 |
| 6,327,622 | B1 | * 12/2001 | Jindal et al. | 709/228 |
| 6,330,602 | B1 | * 12/2001 | Law et al. | 709/224 |
| 6,446,120 | B1 | * 9/2002 | Dantressangle | 709/224 |
| 6,513,061 | B1 | * 1/2003 | Ebata et al. | 709/203 |
| 2001/0010059 | A1 | * 7/2001 | Burman et al. | 709/224 |
| 2002/0059429 | A1 | * 5/2002 | Carpenter et al. | 709/227 |

FOREIGN PATENT DOCUMENTS

| | | | |
|---|---|---|---|
| EP | 0841772 | 5/1998 | .......... H04L/12/00 |
| JP | 10-021334 | 1/1998 | .......... G06K/9/62 |
| JP | 10-307783 | 11/1998 | .......... G06F/13/00 |
| JP | 11-212886 | 8/1999 | .......... G06F/13/00 |

OTHER PUBLICATIONS

Law, K.L.E, et al., "A Scalable and Distributed WWW Proxy System", Proc. IEEE Intl. Conf. Multimedia Computing and Systems, Jun. 3–6, 1997, pp. 565–571.*

(Continued)

*Primary Examiner*—Frantz B. Jean
(74) *Attorney, Agent, or Firm*—Jerry W. Herndon; Yee & Associates, P.C.

(57) ABSTRACT

The present invention relies on dynamic autoproxy configuration and more particularly to a method and system for selecting a Proxy/Socks Server according to some response time and availability criteria. It rests on a dynamic autoproxy mechanism using availability and response time probes. It relies on probes retrieving well known HTML pages through each Proxy/Socks Server, measuring associated response time, detecting Proxy/Socks failures and degradation of response time. It also uses a CGI (Common Gateway Interface) program for dynamically creating autoproxy code (in a preferred embodiment Javascript code) on an autoproxy URL (Universal resource locator) system for selecting said Proxy/Socks Server.

14 Claims, 8 Drawing Sheets

Physical view of availability and response time probes external flows

OTHER PUBLICATIONS

Law, K.L.E.; Nandy, B.; Chapman, A. A scalable and distributed WWW proxy system Multimedia Computing and Systems '97. Proceedings., IEEE International Conference on, Jun. 3–6, 1997, pp.: 565–571.*

D.B. Chapman & E.D. Zwicky, "Building Internet Firewalls", Sep. 1995, O'Reilly & Associates, Inc., Sebastopol, CA.

S. P. Hadjiefthymiades et al, "Improving the Performance of CGI Compliant Database Gateways", Computer Networks and ISDN Systems, vol. 29, No. 8–13, Sep. 1, 1997.

Resolution of Web Traffic Using HYPERFLOW, Windows NT Powers No. 13/5, 1998, pp. 185–197 (Japanese).

Super Proxy Script—How to Make Distributed Proxy Servers by URL Hashing; http://naragw.sharp.co.jp/sps/indesj.html (Japanese).

WWW Server Load Distribution Tool, Nikkei Internet Technology, Aug. 1998, pp 148–157.

Navigator Proxy Auto–Config File Format, Mar. 1996, http://home.netscape.com/eng/mozilla/2.0/relnotes/demo/proxy–live.htm, 13 pages.

* cited by examiner

General physical view of a end user accessing the World-Wide-Web

Flow chart of internal logic of availability and response time probe

Physical view of availability and response time probes external flows

METHOD AND SYSTEM FOR OPTIMALLY SELECTING A WEB FIREWALL IN A TCB/IP NETWORK

TECHNICAL FIELD OF THE INVENTION

The present invention relates to computer networks, and more particularly to a method and system in a TCP/IP network for optimally selecting a Web Firewall according to some response time and availability criteria.

BACKGROUND ART

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a protocol referred to as TCP/IP ("Transmission Control Protocol/Internet Protocol"). TCP/IP protocol supports three basic applications on the Internet:

- transmitting and receiving electronic mail,
- logging into remote computers (the "Telnet"), and
- transferring files and programs from one computer to another ("FTP" or "File Transfer Protocol").

World Wide Web

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:

- an Internet-based navigation system,
- an information distribution and management system for the Internet, and
- a dynamic format for communicating on the Web.

The Web seamlessly, for the user, integrates the formatting of information, including still images, text, audio and video. A user on the Web using a graphical user interface ("GUI", pronounced "gooey") may transparently communicate with different host computers on the system, and different system applications (including FTP and Telnet), and different information formats for files and documents including, for example, text, audio and image (graphics).

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing:

- convert user specified commands into HTTP GET requests,
- connect to the appropriate Web server to get information, and
- wait for a response. The response from the server can be the requested document or an error message.

After the document or an error message is returned, the connection between the Web client and the Web server is closed.

The first version of HTTP is a stateless protocol. That is with HTTP, there is no continuous connection between each client and each server. The Web client using HTTP receives a response as HTML data or other data. This description applies to version 1.0 of HTTP protocol, while the newer versions 1.1 breaks this barrier of stateless protocol by keeping the connection between the server and client alive under certain conditions.

Browser

After receipt, the Web client formats and presents the data or activates an ancillary application such as sound player to present the data. To do this, the server or the client determines the various types of data received. The Web Client is also referred to as the Web Browser, since it in fact browses documents retrieved from the Web Server.

Domain Names

The host or computers names (like www.entreprise.com) are translated into numeric Internet addresses (like 194.56.78.3), and vice versa, by using a method called DNS ("Domain Name Service"). DNS is supported by network-resident servers, also known as domain name servers or DNS servers.

Intranet

Some companies use the same mechanism as the Web to communicate inside their own corporation. In this case, this mechanism is called an "Intranet". These companies use the same networking/transport protocols and locally based Web servers to provide access to vast amount of corporate information in a cohesive fashion. As this data may be private to the corporation, and because the members of the company still need to have access to public Web information, to avoid that people not belonging to the company can access to this private Intranet coming from the public Internet, they protect the access to their network by using a special equipment called a Firewall.

Firewall

A Firewall protects one or more computers with Internet connections from access by external computers connected to the Internet. A Firewall is a network configuration, usually created by hardware and software, that forms a boundary between networked computers within the Firewall from those outside the Firewall. The computers within the Firewall form a secure sub-network with internal access capabilities and shared resources not available from the outside computers.

Often, a single machine, on which the Firewall is, allows access to both internal and external computers. Since the computer, on which the Firewall is, directly interacts with the Internet, strict security measures against unwanted access from external computers are required.

A Firewall is commonly used to protect information such as electronic mail and data files within a physical building or organization site. A Firewall reduces the risk of intrusion by unauthorized people from the Internet, however, the same security measures can limit or require special software for those inside the Firewall who wish to access information on the outside. A Firewall can be configured using "Proxies" or "Socks" to designate access to information from each side of the Firewall.

Proxy Server

A HTTP Proxy is a special server that typically runs in conjunction with Firewall software and allows an access to the Internet from within a Firewall. The Proxy Server:

waits for a request (for example a HTTP request) from inside the Firewall, forwards the request to the remote server outside the Firewall, reads the response, and sends the response back to the client.

A single computer can run multiple servers, each server connection identified with a port number. A Proxy Server, like an HTTP Server or a FTP Server, occupies a port. Typically, a connection uses standardized port numbers for each protocol (for example, HTTP=80 and FTP=21). That is why an end user has to select a specific port number for each defined Proxy Server. Web Browsers usually let the end user set the host name and port number of the Proxy Servers in a customizable panel. Protocols such as HTTP, FTP, Gopher, WAIS, and Security can usually have designated Proxies. Proxies are generally preferred over Socks for their ability to perform caching, high-level logging, and access control, because they provide a specific connection for each network service protocol.

Socks

A Socks Server (also called a Socks Gateway) is also software that allows computers inside a Firewall to gain access to the Internet. Socks is usually installed on a server positioned either inside or on the Firewall. Computers within the Firewall access the Socks Server as clients to reach the Internet. Web Browsers usually let the end user set the host name and port number of the Socks hosts (servers) in a customizable panel. On some Operating Systems, the host is specified in a separate file (e.g. socks.conf file). As the Socks Server acts as a layer underneath the protocols (HTTP, FTP, . . . ), it cannot cache data (as a Proxy does), because it doesn't decode the protocol to know what kind of data, it is transferring.

Options

The Web Browser often proposes that the end user select between the different options of "No Proxies", "Manual Proxy Configuration", or "Automatic Proxy Configuration" to designate the conduit between his computer and the Internet.

Users with a direct connection to the Internet should use the default, which is "No Proxies".

If the Intranet is protected by one or several Firewalls, the end user may:

select one of these Firewalls as the elected Proxy, by entering its host name into the "Manual Proxy Configuration", or automatically refer to the enterprise policy in terms of Proxy attribution between locations, by pointing to a common configuration file in a remote server. This is done by choosing the "Automatic Proxy Configuration" and by providing the Web Browser with the unique address of the common configuration file ("Universal Resource Locator" or "URL") located in the remote server.

Today, most of the Web Browsers are configured to forward all requests, even requests for internal hosts, through the Socks Firewall. So when the end user wants to have access to an internal Web-based application, his request travels to the Firewall, and is then reflected back into the internal network. This sends internal traffic on a long path, puts extra load on the Firewall and on the network, and worst of all, slows down the response time the end user sees from the applications and Web pages he is trying to access. This is called "non flexible" Socks access (when everything goes via the Socks Server).

Manual Proxy Configuration

The Manual Proxy configuration in the Web Browser is simple to process, but its main drawback is that the Firewall (or Proxy) selection is then static. There is no dynamic criterion for the Firewall selection, such as selection of the Firewall providing the best response time. Firewall failures require a manual reconfiguration of the navigation software to point to another active Firewall, since the manual configuration usually only allows the definition of one single Firewall per protocol with no possibility to pre-configure a backup Firewall. In addition to the manual proxy configuration in the Web Browser, external procedures can be used to provide some kind of robustness in the Firewall selection. They rely for instance on the use of multiple Firewalls having the same name defined as aliases in the Domain Name Server (DNS). But this technique based on alias definition still has drawbacks since for instance the DNS is not always contacted for name resolution by Web Clients caching locally the name resolution. Other techniques using external hardware equipment such as load and request dispatcher provide more robustness and load balancing, but still have drawbacks such as the need for additional and costly hardware.

Automatic Proxy Configuration

Automatic Proxy Configuration (or also referred to as "autoproxy") can set the location of the HTTP, FTP, and Gopher Proxy every time the Web Browser is started. An autoproxy retrieves a file of address ranges and instructs the Web Browser to either directly access internal IBM hosts or to go to the Socks Server to access hosts on the Internet.

Automatic Proxy Configuration is more desirable than simple Proxy Server Configuration in the Web Browser, because much more sophisticated rules can be implemented about the way Web pages are retrieved (directly or indirectly). Automatic Proxy Configuration is useful to users, because the Web Browser knows how to retrieve pages directly if the Proxy Server fails. Also Proxy requests can be directed to another or multiple Proxy Servers at the discretion of the system administrator, without the end user having to make any additional changes to his Web Browser configuration. In general, these Proxy configuration files (also called autoproxy code) are usually written in the Javascript language. Autoproxy facility can also contain a file of address ranges for instructing the Web Browser to either directly access internal hosts or to go to the Socks Server to access hosts on the Internet. The Socks Server protects the internal network from unwanted public access while permitting access of network members to the Internet. One of the drawbacks of this "autoproxy" mechanism is that there is no proactive Firewall failure detection nor response time consideration.

More explanations about the domain presented in the above sections can be found in the following publications:
"Java Network Programming" by Elliotte Rusty Harold, published by O'Reilly, February 1997.
"Internet in a nutshell" by Valerie Quercia, published by O'Reilly, October 1997.
"Building Internet Firewalls" by Brent Chapman and Elizabeth Zwichky, published by O'Reilly, September 1995.
Problem The problem to solve is to provide an optimized Web access, with a dynamic Proxy or Socks Server selection to get the best response time, and a detection of failures in Proxy or Socks Server to prevent Web service disruption. The current solutions address this problem partially:

Web Browsers can be manually configured with the target Proxy or Socks Server. The main drawbacks of this solution are the following:
  There is no dynamic Proxy/Socks Server selection. A manual reconfiguration of the Web Browser upon Proxy/Socks Server failure is required.
  Only a "manual" load balancing through the Web Browser static configuration is provided.
  Proxy/Socks Server names must be known and manually configured by end users.
Web Browsers can be configured with their autoproxy feature, using a static list of target Proxy/Socks Servers downloaded from a dedicated autoproxy URL (Uniform Resource Locator) system. The main drawback of this solution is the following:
  There is no response time consideration in the Proxy/Socks Server selection, nor efficient Proxy/Socks Server failure detection (i.e. Web Browser waits for time-out before switching to backup, even at initial autoproxy loading) in the Proxy/Socks Server selection.

An alternate to these current solutions is to cluster the Proxy/Socks Servers using an external dispatcher system acting as single logical access point. All Web Browsers are then manually configured with the name of that external dispatcher system (as the target Proxy/Socks Server) which then routes the traffic to a selected Proxy/Socks Server. An example of such a dispatcher is for example the IBM Interactive Network Dispatcher product. More information concerning this product can be found in IBM's publication entitled "Interactive Network Dispatcher V1.2-User's Guide" GC31-8496-01. Although a dispatcher oriented solution allows an efficient load balancing in most cases, its main drawback is that additional dedicated system or specific hardware is required, and that the external dispatcher name has to be manually configured by the end users in their Web Browsers.

OBJECTS OF THE INVENTION

The object of the present invention is to optimize Proxy/Socks Server selection by using availability and response time criteria.

It is a further object of the present invention to optimize the Web service performance by integrating a response time factor to the Proxy/Socks Server selection.

It is another object of the present invention to minimize Web service interruption and thus to insure a better service availability by automatically detecting Proxy/Socks Server failures.

SUMMARY OF THE INVENTION

The present invention relates to dynamic autoproxy configuration and more particularly to a method and system for optimizing selection of a Proxy/Socks Server according to some response time and availability criteria. The invention rests on a dynamic autoproxy mechanism using availability and response time probes.

The present invention also relies on probes retrieving well known HTML pages through each Proxy/Socks Server, measuring associated response time, detecting Proxy/Socks failures and degradation of response time.

The present invention also uses a CGI (Common Gateway Interface) program for dynamically creating autoproxy code (in a preferred embodiment Javascript code) on an autoproxy URL (Universal Resource Locator) system for selecting the Proxy/Socks Server using availability and response time information provided by probes.

The present invention fixes the drawbacks of the existing current solutions by integrating dynamic Proxy/Socks availability and response time selection criteria to the autoproxy mechanism.

The present inventions provides the following advantages:
  Early detection of Proxy/Socks Servers failures provides a high Web service availability.
  Integration of a response time factor to the Proxy/Socks Server selection optimizes the Web service performances.
  Induced HTTP survey traffic is minimized by running availability and response time probes from a single autoproxy URL system (compared with running the probes on each Web Browser system).
  Integration of response time degradation in the probes achieves a proactive Proxy/Socks Servers failure detection.
  Periodical dynamic update of "best" Proxy/Socks Server can be provided to Web Browser.
  Useless traffic to failing Proxy/Socks Server is minimized since Proxy/Socks Servers are excluded from list of available target servers upon failure detection.
  No additional or specific hardware is required.
  Ease of Web Browser configuration provided to mobile users (Web Browser is configured once).
  Web Browser performance is not degraded because availability and response time probes are not processed within the downloaded autoproxy code (Javascript code) but in the autoproxy URL system.

DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

Preferred Embodiment of the Invention

The present invention relies on dynamic autoproxy configuration and more particularly to a method and system for selecting a Proxy/Socks Server according to some response time and availability criteria. It rests on a dynamic autoproxy mechanism using availability and response time probes. It relies on probes retrieving well known HTML pages through each Proxy/Socks Server, measuring associated response time, detecting Proxy/Socks failures and degradation of response time.

It also uses a CGI (Common Gateway Interface) program for dynamically creating autoproxy code (in a preferred embodiment Javascript code) on an autoproxy URL (Universal resource locator) system for selecting said Proxy/Socks Server.

Logical View of a End User Accessing the World Wide Web

Figure 1:
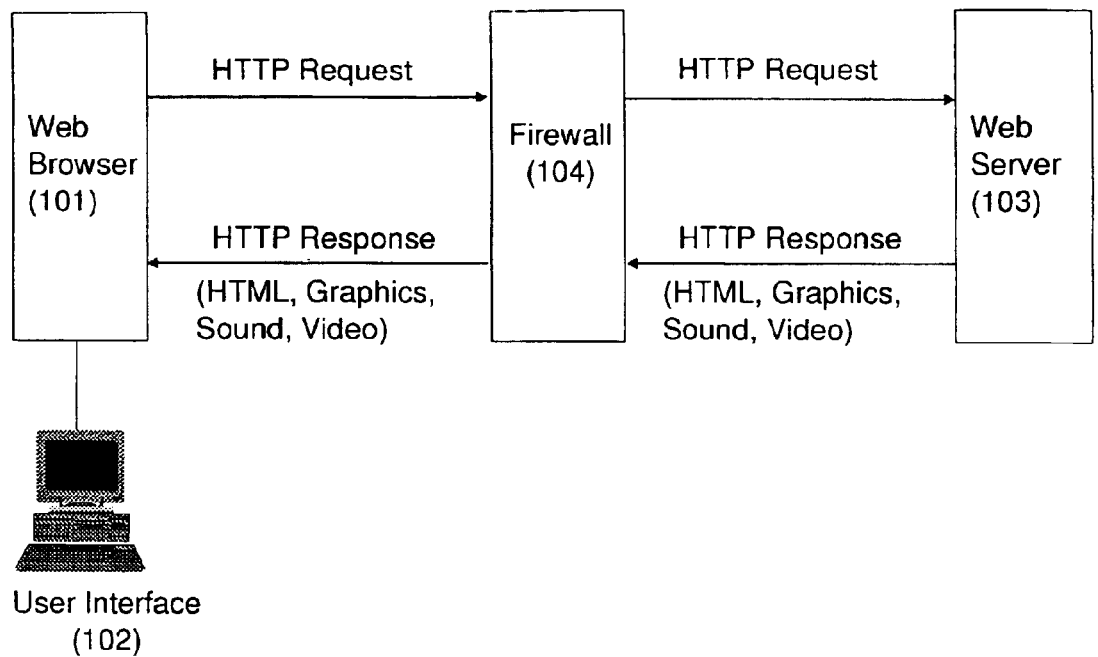
FIG. 1 is a general logical view of an end user system interfacing a Web Browser for accessing the World Wide Web according to prior art.

FIG. 1 shows a user system with a user interface (102) running a program known as a Web Browser (101) which enables access to the World-Wide-Web (WWW). The WWW content is transferred using the HTTP protocol. HTTP requests and responses are going to and from the Web Browser program (101) and a destination Web Server (103) containing the WWW content the user tries to access. The Firewall (104) between the Web Browser (101) and the Web Server (103) acts as an intermediary HTTP Proxy forwarding the HTTP requests and responses to their destination. The Web Browser program (101) makes an HTTP request to the Firewall (104) and the Firewall forwards the request to the destination Web Server (103). The flow in the reverse direction is the HTTP response which again goes via the Firewall (104) on its way to the Web Browser (101). In this way the Firewall can limit the traffic to the transactions it is configured to allow (based on some defined security and access control policy). The Firewall hence protects the network where the Web Browser is located.

General Physical View of an End User Accessing the WWW

Figure 2:
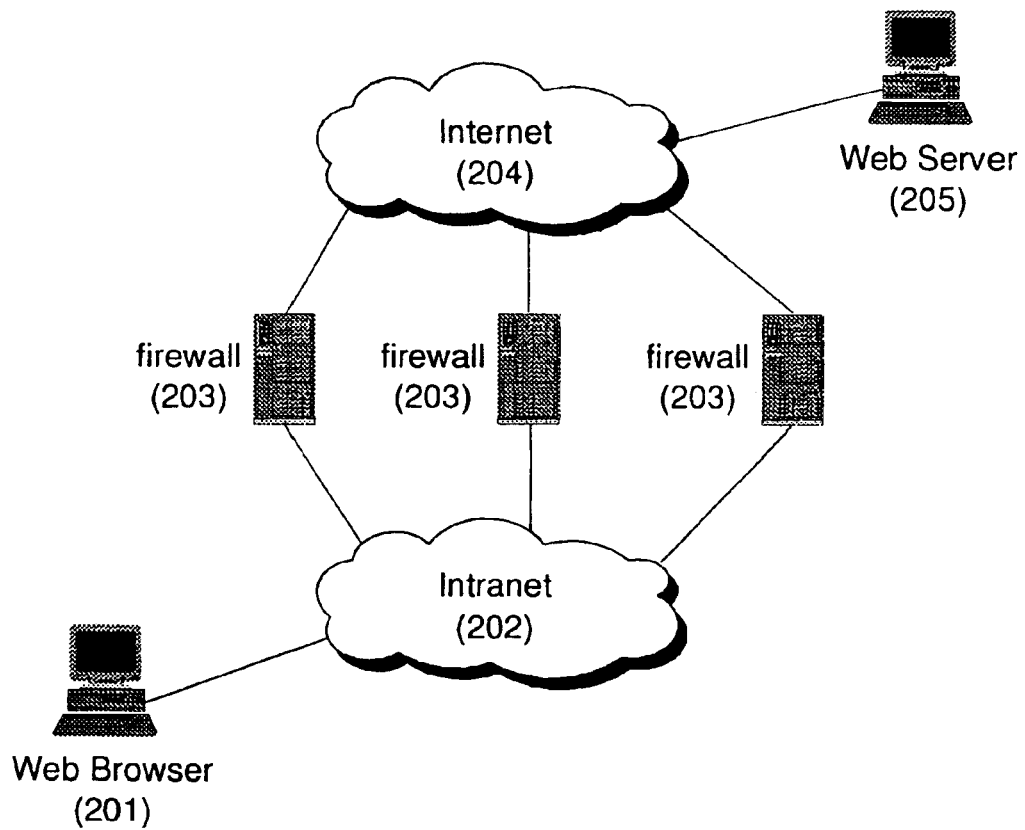
FIG. 2 is a general physical view of the set-up shown in FIG. 1, according to prior art.

FIG. 2 is a physical view of the set-up shown logically in FIG. 1. In this particular example, the Web Browser (201) runs on a system attached to an Intranet (202). The Firewalls (203) that protect the Intranet attach both the (private) Intranet (202) and the (public) Internet (204). The destination Web Server (205) also connects to the Internet. This is the environment where the Web Browser, Firewalls, and Web Server perform their function when the user is "browsing" the Internet WWW. It is important to note the fact the Firewalls attach two networks and hence are able to act as the intermediary for communications between the two networks. Multiple Firewalls are often uses in order to provide some degree of access robustness and load sharing.

Logical View of Availability and Response Time Probes

Figure 3:
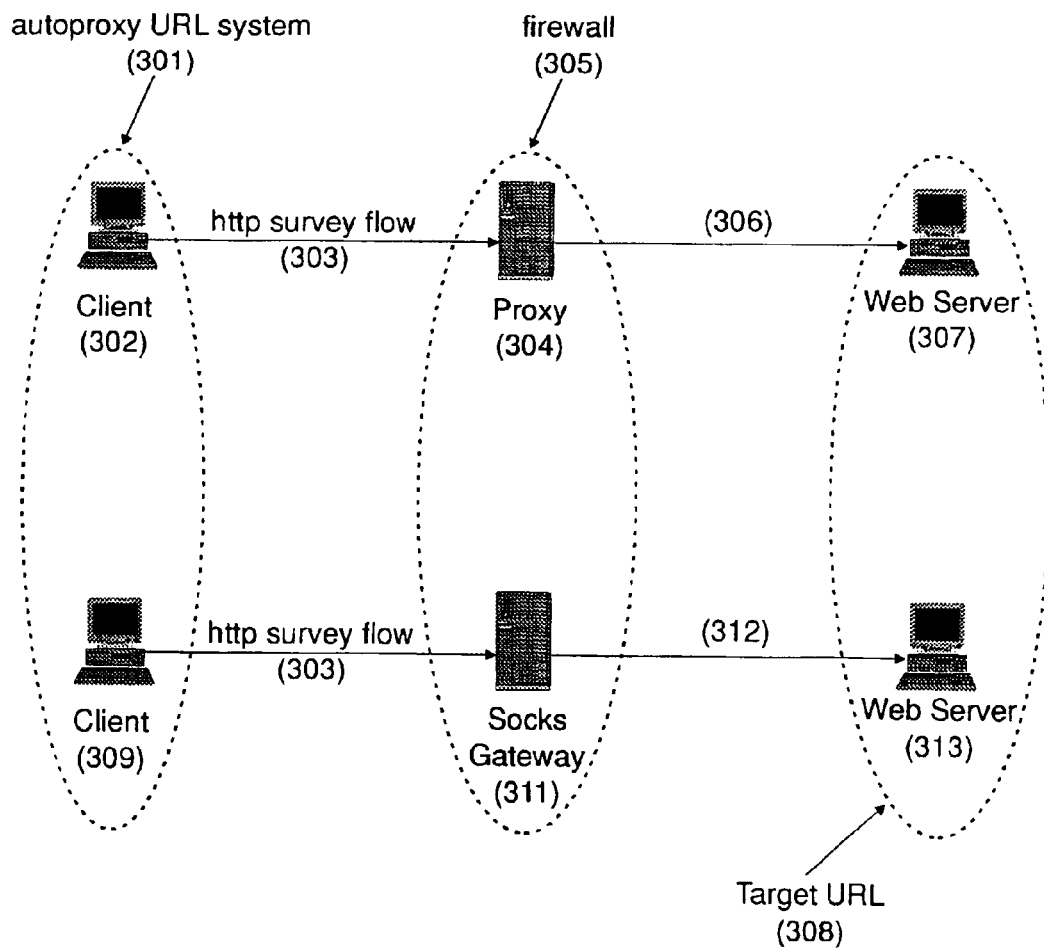
FIG. 3 is a logical view of the availability and response time probes external flows according to the present invention.

The domain of the invention is the one described in FIG. 1 and FIG. 2, where a user within an Intranet wants to access the World-Wide-Web using a Web Browser, and where the Intranet network is protected from the Internet by several Firewalls playing role of so called HTTP Proxies (FIG. 2). The issue is to select the "best" Proxy/Socks Server to insure an optimized availability and response time of the service to the end user. To automatically optimize this selection, a software component called a "WWW availability and response time probe" is introduced. Its role is to provide selection criteria. As shown in FIG. 3, this data is gathered by measuring the response time for requesting a specific content of a well known Web Server. The induced HTTP survey traffic is minimized, by running the availability and response time probes from single autoproxy URL system (versus running the probes on each Web Browser client system).

FIG. 3 demonstrates the function of a flexible WWW availability and response time probe and the way it can be used to gather measurements on the availability and response time of both HTTP Proxies and Socks Servers. The upper part of FIG. 3 details the interaction of the probe with an HTTP Proxy Server (304). The client system (302) that runs the probe (configured to test proxies) basically requests Web content (page) from the Web Server (307) via the Proxy Server (304) similar to the process shown in FIG. 1. The HTTP request in this case represents an "HTTP survey flow" (303) to the Proxy Server. The Proxy Server forwards (306) the request to the Web Server (via the Firewall (305) which is not depicted). The client system times how long the request/response HTTP survey flow takes and uses this information as a measurement of the response time and availability via the tested Proxy Server (for the Web content samples that were tested). If the client system is also the autoproxy URL system (301) then this measurement information for each Proxy Server can be used to work out a sense of the "best" Proxy Server to use. This can then be encoded in the autoproxy URL that the Web Browser programs use to work out their correct Proxy Server to use.

The lower portion of the FIG. 3 shows a similar arrangement but in this case the measurements data is being gathered for a Socks Server (Gateway) access method. Again a client probe (309) makes an HTTP request that represents an "HTTP survey flow" (310) which travels via the Socks Server (311) and then onto (312) the destination Web site (313). This HTTP request is for a set target URL (308) that is known to exist on the target Web Server. Again it is the timing of how long this survey takes that provides the measurements data that can be used to generate an autoproxy URL that takes into account the relative performance of a set of Socks Server (or in the case above, HTTP Proxies).

Obviously if there is no response to the HTTP survey flow, then the particular Proxy or Socks Server being tested can be marked as unavailable. In this way the autoproxy URL can be used to not select Proxy or Socks Servers that do not work.

Internal Logic of the Availability and Response Time Probes

Figure 4:
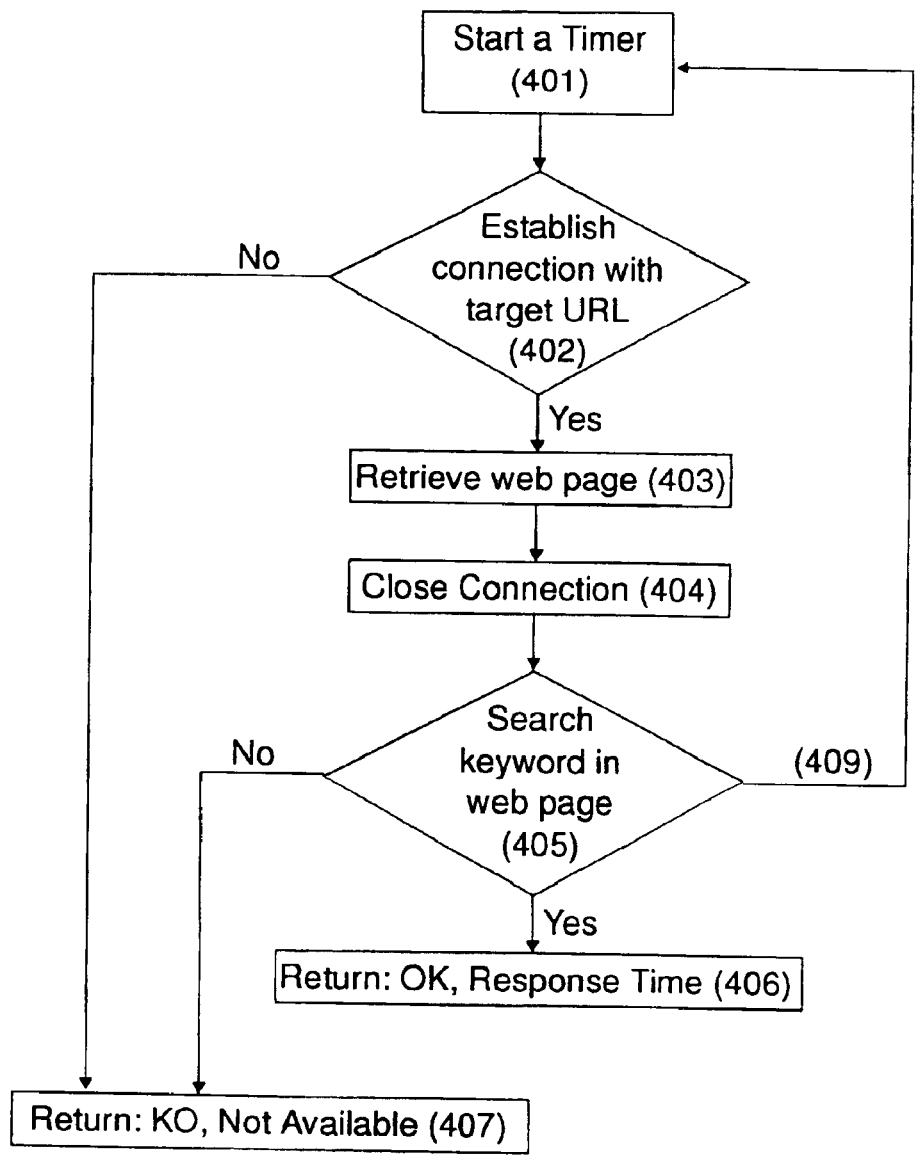
FIG. 4 is a flow chart showing the internal logic flow of the availability and response time probe introduced in FIG. 3 according the present invention.

The internal mechanism of the probe itself is described in FIG. 4. The probe simulates a Web Client, by requesting through an HTTP connection a Web page from a target URL through the target Proxy/Socks Server (using its host name and port as a reference). The Web page is retrieved either through a normal HTTP connection, or through a socksified flow (a flow through a Socks Server). Typically, normal flow is used to retrieve a Web page from a Proxy Server or from a Web Server, while socksified flow is used to retrieve a Web page through a Socks Server. Then, the probe basically checks that the Web page:

is received within an allowed amount of time in seconds, and contains a specific keyword to make sure that the received page is correct.

When these two conditions are fulfilled, the Web page retrieval is successful.

Finally, the probe returns either the associated response time in seconds (successful retrieval) or a failure return code. This mechanism retrieves one or multiple target Web pages. When multiple Web pages are retrieved, the probe program sequentially tests each Web page until one Web page retrieval is successful or all Web page retrievals fail. Probes:

retrieve well known HTML pages through each Proxy/Socks Server, measure associated response time, and also detect Proxy/Socks Server failures and response time degradation.

FIG. 4 is a flow chart showing the internal logic flow of the WWW availability and response time probe introduced in FIG. 3.

The first thing the probe program does is to start a timer (401).

Next the probe program attempts to establish a connection (402) with the target Web Server to retrieve a Web page at the target URL (Universal Resource locator). The probe program establishes the connection according to the way it has been configured e.g. via an HTTP Proxy Server, via a Socks Server (Gateway) or directly.

If the attempt for establishing the connection is unsuccessful, the probe program immediately goes into error mode (408). An error value is returned (407) by the probe program indicating that the connection is not possible.

If the attempt for establishing the connection is successful, then the Web page (403) is retrieved by the probe program.

The probe program then closes the connection (404) pursuant to the normal HTTP protocol procedure.

To ensure that the Web page has been correctly retrieved, the probe program then searches for known keywords (405) that are expected to be in the Web page.

If the keyword is found (406) in the Web page, then the Web page retrieval is successful. The timer is stopped and the correct response time for the operation is returned. By storing and integrating a short historic of the measured response time over time, the probe program can detect and return any response time degradation, thus enabling an anticipation of the Proxy/Socks Servers failures.

If however the correct keyword is not found (407) in the Web page, then the Web retrieval is unsuccessful and again an error value is returned. The type of event that might trigger this sort of error is when the connection is successfully established but a Web page with an error is retrieved.

The action whereby the probe goes into retry mode (409) occurs only when the probe is configured to try multiple destination URL's as opposed to a single URL. This adds some robustness to the testing of the probe and hence insulates it somewhat from one-off network "glitches" (e.g. dropped connections etc.).

Physical View of Availability and Response Time Probes
External Flows

The probes are used by various components and in various flows (FIGS. 5 and 6) in order to provide the Web Browser with the best Proxy/Socks Server. The data gathered by the probes are indirectly downloaded to the Web Browser by using an autoproxy mechanism. The present invention allows a software implementation with no additional or specific hardware.

Figure 7:
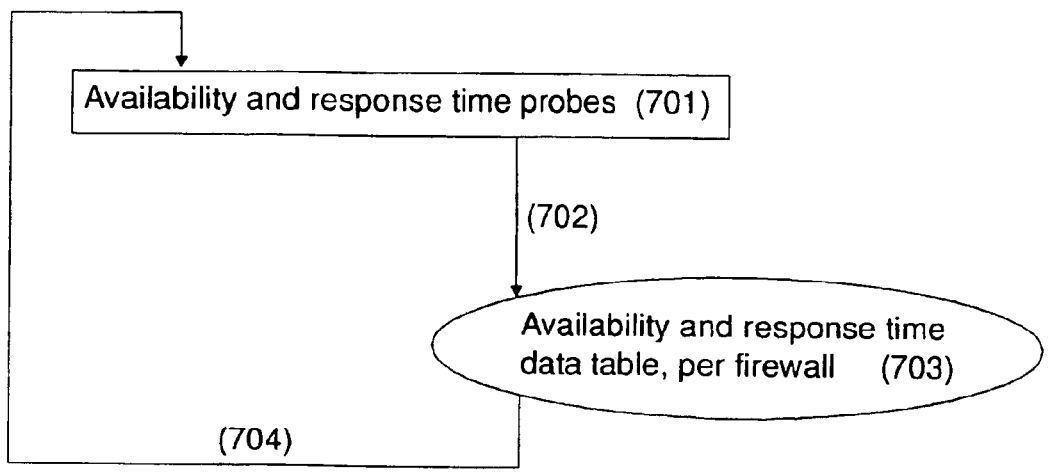
FIG. 7 depicts the storage of the availability and response times probes measurements, according to the present invention.

The output from the probe is stored on the autoproxy URL system as shown in FIG. 7 and used to create the autoproxy code (Javascript code in a preferred embodiment). There is no extra process inside the code. Web Browser performance is not degraded because availability and response time probes are not processed within the downloaded autoproxy code (Javascript code) but in the autoproxy URL system.

Figure 8:
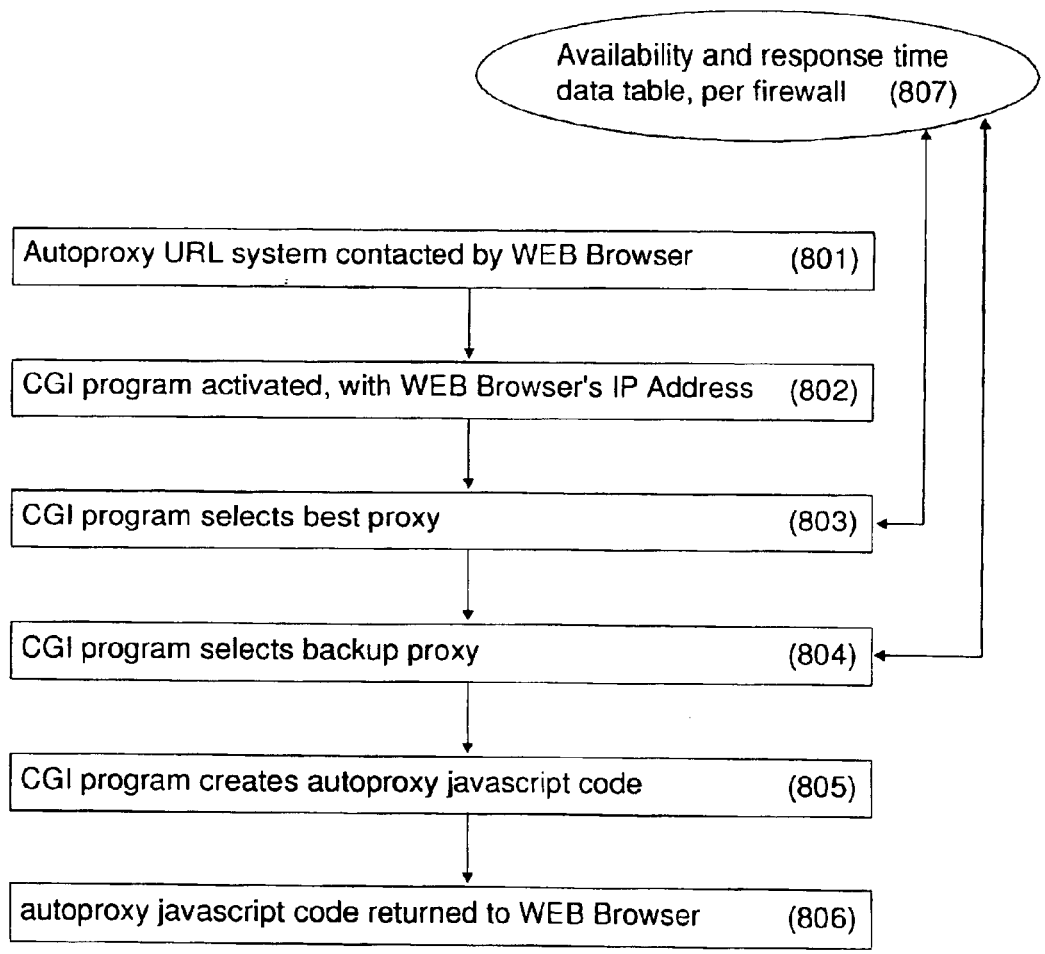
FIG. 8 is a flow chart of the program running on the autoproxy URL (Universal Resource Locator) system, according to the present invention.

A CGI (Common Gateway Interface) program dynamically creates the autoproxy code as shown in FIG. 8 with the availability and response time information provided by probes. The use of response time and availability criteria for selecting a Proxy/Socks Server by the probes is fully compatible, and can be combined, with existing criteria such as client's origin IP subnet.

The use of response time and availability criteria also provides a proactive Proxy/Socks Servers failure detection through the integration of response time degradation. The Web Browser can be periodically and dynamically updated with a new selection of the "best" Proxy/Socks Server using:

"refresh" tag in the autoproxy code, external code (or Java applet), or a new feature in the Web Browser for periodically and automatically refreshing the autoproxy code.

Another positive consequence is the minimization of the useless traffic to failing Proxy/Socks Server since Proxy/Socks Servers are excluded from list of available target servers upon failure detection. Since an autoproxy mechanism is used, there is no need for manually updating the manual proxy configuration in the Web Browser in case of Proxy/Socks Server failure. Proxy/Socks Servers names or locations don't need to be known and configured by the end user, thus providing for instance a seamless service for mobile users.

Figure 5:
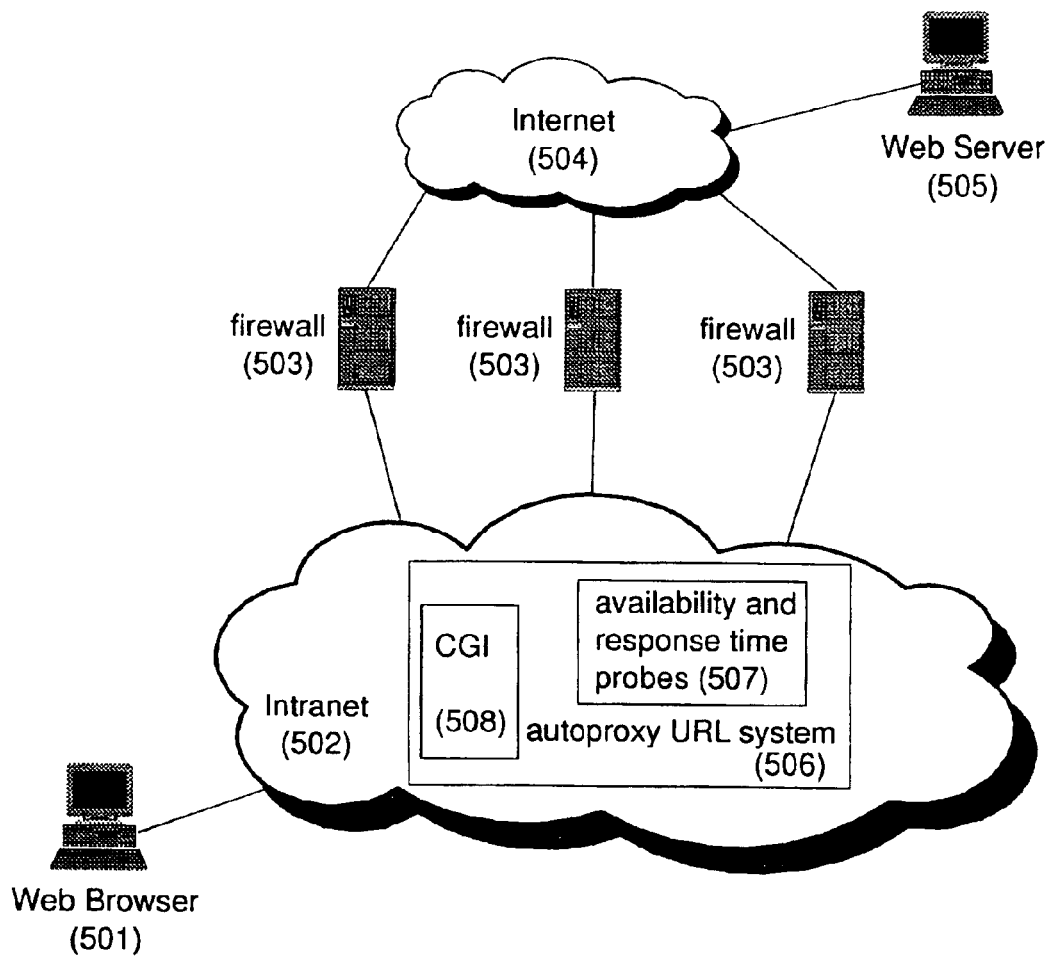
FIG. 5 is a physical view of the logical environment described in FIG. 3 according to the present invention.

FIG. 5 is a physical view of the logical environment described in FIG. 3. The Web Browser (501) attached to the Intranet (502) is configured to use an autoproxy URL to determine which Proxy/Socks Server (Firewall) (503) to use for having access to the Internet (504) and the destination Web Server (505). The system where the autoproxy URL resides (506) also runs the availability and response time probes (507) configured to test the Proxy/Socks Servers. The autoproxy URL uses the CGI (Common Gateway Interface) (508) to dynamically generate the autoproxy code of the autoproxy URL. The autoproxy code is based on the information gathered by the availability and response time probes. In this way the Web Browser is configured with an available Proxy/Socks Server, and what is deemed the best Proxy/Socks Server.

Data Flows of Availability and Response Time Probes

Figure 6:
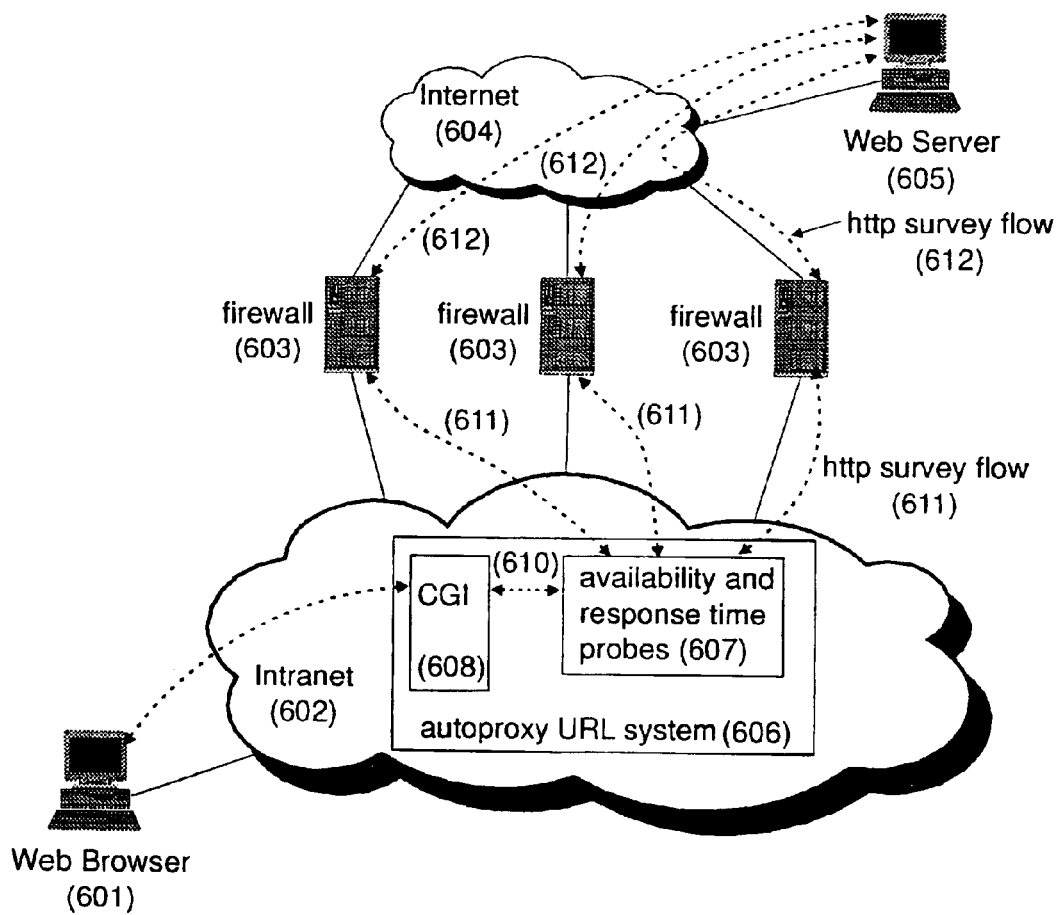
FIG. 6 is a view of the data flows associated with the entities depicted in FIG. 5, according to the present invention.

FIG. 6 is a view of the actual data flows associated with the entities depicted in FIG. 5. Again, the Web Browser (601) attached to the Intranet (602) is configured to use an autoproxy URL to determine which Proxy/Socks Server (Firewall) (603) to use for having access to the Internet (604) and the destination Web Server (605). The Web Browser has access (609) to the autoproxy URL system (606) to first determine which Proxy/Socks Server1 it should use. The Web Browser can be periodically and dynamically updated with the "best" Proxy/Socks Server using:
- the "refresh" tag in the autoproxy code,
- an external code (or Java applet), or
- a Web Browser new feature for periodically and automatically refreshing the autoproxy code.

The system where the autoproxy URL resides and which runs the availability and response time probes (607), uses the CGI (Common Gateway Interface) (608) to dynamically generate the autoproxy code (610) of the autoproxy URL. The autoproxy code is based on the information gathered by the availability and response time probes that have tested the Proxy/Socks Servers via the HTTP survey flows (611 and 612) described in FIG. 3. In this way the Web Browser ends up with what is deemed the best Proxy/Socks Server.

Internal Storage of Availability and Response Time Probes

FIG. 7 depicts the internal storage within the autoproxy URL system of the information retrieved by the availability and response times probes (701). Each probe updates (702) a table in the autoproxy URL system (703) with the measurements of each Proxy/Socks Server it tests. In this way the table contains the current state of all Proxy/Socks Servers that are candidate to be selected and used by the Web Browser. At configurable or periodical time intervals, probes test again the Proxy/Socks Servers (704) and the cycle again is repeated.

Program Running at Autoproxy URL System

FIG. 8 again refers to the internal logic of the program running on the autoproxy URL system.

The autoproxy URL system is initially contacted by a Web Browser (801) wanting to "know" which is the best Proxy/Socks Server (or Firewall) to use. This is for instance achieved by selecting the Automatic Proxy Configuration option in the Web Browser and by providing information such as the URL of the autoproxy code.

The autoproxy URL system activates (802) the CGI (Common Gateway Interface) program (via the Web Server CGI extensions). The CGI program has access to all standard CGI variables including the IP (Internet Protocol) address of the Web Browser.

The CGI program selects (803) the best Proxy/Socks Server for the client system (Web Browser) based on both the IP address of the Web Browser (obtained as a CGI variable) and the information generated by the availability and response time probes for each Proxy/Socks Server and stored in the table of the autoproxy URL system (807). The IP address is used to add a geographical criteria to the Proxy/Socks Server selection. For instance, if two Proxy/Socks Servers provide the same response time (one in the US, the other one in Europe), the closest Proxy/Socks Server is preferred (the one in Europe if the Web Browser is in Europe).

To improve the robustness of the Proxy/Socks Server selection, the CGI program selects a best "backup" Proxy/Socks Server for the Web Browser (804). This "backup" Proxy/Socks Server is automatically used by the Web Browser after it times out attempting to use what it thinks is the "best" Proxy/Socks Server. Again this "backup" Proxy/Socks Server is selected using both the IP address of the Web Browser (obtained as a CGI variable) and the information generated by the availability and response time probes for each Proxy/Socks Server and stored in the table of the autoproxy URL system (807).

Once the CGI program has selected the best and backup Proxy/Socks Servers, it created the autoproxy code (805). This code is generally made of Javascript language.

Once the autoproxy code has been created, the autoproxy URL system downloads it to the Web Browser (806) via standard HTTP protocol as any other output of a CGI program.

While the invention has been particularly shown and described with reference to a preferred embodiment, it will be understood that various changes in form and detail may be made therein without departing from the spirit, and scope of the invention.

What is claimed is:

1. A method for dynamically selecting a firewall server for a web client, in particular a web browser, in a Transmission Control Protocol/Internet Protocol (TCP/IP) network comprising a plurality of firewall servers, said method comprising the steps of:

measuring performance and availability of each firewall server using measurement probes, including measuring the total response time needed for retrieving from a web server known information, in particular one or a plurality of known web pages, through each firewall server and wherein the step of measuring the total response time comprises the further steps, for each firewall server, of:

starting timing for a given one of said plurality of firewall servers;

establishing a connection with the web server through said given one of said plurality of firewall servers;

retrieving the one or a plurality of known web pages from the web server;

checking that the retrieved one or plurality of web pages contain one or a plurality of known keywords; and stopping timing for said given one of said plurality of firewall servers; and dynamically selecting a firewall server according to the performance and availability measurements.

2. The method according to claim 1 wherein the step of measuring the performance of each firewall server using measurement probes comprises the further step of:

comparing each firewall server said measured total response time with previous measured total response times; and, determining for each firewall the degradation or the amelioration of the measured total response time.

3. The method according to claim 1 wherein the step of measuring the availability of each firewall using measurement probes comprises the further step of:

detecting failures on each firewall server; and, excluding firewall servers in failure from the step of selecting a firewall server.

4. The method of according to claim 1 wherein said firewall server is a proxy server or a socks server.

5. The method according to claim 1 comprising the further steps of:

processing performance and availability measurements from a single universal resource locator (URL) system; and, dynamically creating a configuration file based on the performance and availability measurements, preferably in the Javascript language, on said universal resource locator (URL) system for selecting said firewall server.

6. The method according to claim 5 wherein the step of dynamically creating a configuration file is processed by a common gateway interface (CGI) on said universal resource locator (URL) system.

7. The method according to claim 1 wherein the step of selecting a firewall server comprises the further step of downloading the configuration file from a universal resource locator (URL) system to a web browser.

8. The measured according to claim 7 wherein the steps of measuring performance and availability and of dynamically selecting a firewall server are periodically processed in the universal resource locator (URL) system and the configuration file created by the common gateway interface (CGI) is periodically downloaded to the web client.

9. The method according to claim 1 comprising the further steps of:

pre-selecting a backup firewall server in a background process; and, switching to said backup firewall server in case of failure of the selected firewall server.

10. The method according to claim 1 wherein the step of selecting a firewall server according to performance and availability measurements comprises the further step of selecting the firewall server according to the Internet Protocol (IP) address of the web browser.

11. A program product for dynamically selecting a firewall server for a web client, in particular a web browser, in a Transition Control Protocol/Internet Protocol (TCP/IP) network comprising a plurality of firewall servers, said program product to be executed by a machine to perform a method comprising the steps of:

programmatically measuring performance and availability of each firewall server using measurement probes, including programmatically measuring the total response time needed for retrieving from a web server known information, in particular one or a plurality of known web pages, through each firewall server and wherein the step of programmatically measuring the total response time comprises the further steps, for each of said plurality of firewalls, of:

starting timing for a given one of said plurality of firewall servers;

programmatically establishing a connection with the web server through said given one of said plurality of firewall servers;

programmatically retrieving the one or a plurality of known web pages from the web server;

programmatically checking that the retrieved one or plurality of web pages contain one or a plurality of known keywords; and stopping timing for said given one; and dynamically, using programmatic means, selecting a firewall server according to the performance and availability measurements.

12. The program product according to claim 11 wherein the step of measuring the performance of each firewall server using measurement probes comprises the further step of:

programmatically comparing each firewall server said measured total response time with previous measured total response times; and, programmatically determining for each firewall the degradation or the amelioration of the measured response time.

13. The program product according to claim 11 wherein the step of measuring the availability of each firewall server using measurement probes comprises the further step of:

programmatically detecting failures on each firewall server; and, programmatically excluding firewall servers in failure from the step of selecting a firewall server.

14. The program product according to claim 11 wherein said firewall server is a proxy server or a socks server.

* * * * *

UNITED STATES PATENT AND TRADEMARK OFFICE
CERTIFICATE OF CORRECTION

PATENT NO. : 6,892,235 B1
DATED : May 10, 2005
INVENTOR(S) : Daude et al.

It is certified that error appears in the above-identified patent and that said Letters Patent is hereby corrected as shown below:

<u>Title page, Item [54] and Column 1, lines 1-3,</u>
Title, delete "METHOD AND SYSTEM FOR OPTIMALLY SELECTING A WEB FIREWALL IN A TCB/IP NETWORK" and insert -- METHOD AND SYSTEM FOR OPTIMALLY SELECTING A WEB FIREWALL IN A TCP/IP NETWORK --.

<u>Column 2,</u>
Line 46, after "such as" insert -- a --.

<u>Column 3,</u>
Line 65, after "data" delete ",".

<u>Column 9,</u>
Line 5, after "Typically," insert -- a --.

<u>Column 12,</u>
Line 54, after "firewall" insert -- server --.

<u>Column 13,</u>
Line 13, after "8. The" delete "measured" and insert -- method --.
Line 32, before "Control" delete "Transition" and insert -- Transmission --.

Signed and Sealed this

Fourth Day of April, 2006

JON W. DUDAS
*Director of the United States Patent and Trademark Office*